United States Patent [19]

Takahashi et al.

[11] Patent Number: 5,194,327

[45] Date of Patent: Mar. 16, 1993

[54] ANTISTATIC POLYESTER FILM

[75] Inventors: Teruo Takahashi, Hachioji; Sadayoshi Miura, Yamato, both of Japan

[73] Assignee: Teijin Limited, Osaka, Japan

[21] Appl. No.: 688,425

[22] Filed: Apr. 22, 1991

[30] Foreign Application Priority Data

Apr. 20, 1990 [JP] Japan .................. 2-103133

[51] Int. Cl.$^5$ .................. B32B 5/16
[52] U.S. Cl. .................. 428/327; 428/331; 428/341; 428/483; 428/922
[58] Field of Search ............ 428/327, 341, 331, 483, 428/922

[56] References Cited

U.S. PATENT DOCUMENTS

| | | | |
|---|---|---|---|
| 4,214,035 | 7/1980 | Heberger | 428/340 |
| 4,605,591 | 8/1986 | Nose et al. | 428/332 |
| 4,828,927 | 5/1989 | Timmerman et al. | 428/480 |
| 4,880,700 | 11/1989 | Charmat et al. | 428/337 |

FOREIGN PATENT DOCUMENTS 2855147  6/1979  Fed. Rep. of Germany .
3034139  2/1988  Japan .

Primary Examiner—Paul J. Thibodeau
Assistant Examiner—D. S. Nakarani
Attorney, Agent, or Firm—Wenderoth, Lind & Ponack

[57] ABSTRACT

An antistatic polyester film comprises a polyester film having provided on one or both surfaces thereof a thin layer of a mixed composition, wherein (1) the mixed composition is composed essentially of
   (A) a polyester polyacrylic copolymer (component A);
   (B) an anion-type high molecular weight antistatic agent (component B);
   (C) a fine particle having an average particle diameter of no greater than about 0.5 μm (component C); and
   (D) a wetting agent (component D); and wherein (2) said components A, B, C, and D are present in amounts of about 20 to about 80 parts by weight, about 15 to about 70 parts by weight, about 5 to about 40 parts by weight, and 0 to about 30 parts by weight, respectively, per 100 parts by weight in total of the components A, B and C. Also, a method for producing such antistatic polyester film is described.

12 Claims, No Drawings

ANTISTATIC POLYESTER FILM

BACKGROUND OF THE INVENTION

1. Field of the Invention

This invention relates to antistatic polyester film and method for the production of the same. More particularly, this invention relates to antistatic polyester film having a stable, low surface resistivity and having excellent transparency, evenness, slipperiness and anti-blocking property as well as to method for the production of the same.

2. Prior Arts

Plastic film such as biaxially oriented and thermoset-polyester film is excellent in mechanical properties, heat resistance, gas shielding property, chemical resistance, etc. but the polyester film has a high surface resistivity as high as $10^{14}$ to $10^{17} \Omega/\square$ and is readily charged, resulting in that it tends to arise troubles of adsorbing foreign matters when said film has been used in magnetic recording media or electronic materials.

Heretofore, there have been known various methods for preventing the charge of film such as a method in which an antistatic agent such as lithium dodecylbenzenesulfonate is kneaded in a base polymer, or a method an antistatic agent having a low molecular weight is coated on a surface of a film. However, the former method involving the kneading of an antistatic agent generally results in a poor compatibility between the antistatic agent and the polyester. Hence, if the antistatic agent is kneaded in the polyester in amounts enough to exhibit the antistatic property, the resulting film becomes opaque, and therefore it is disadvantageous to use the film in fields where transparency of film is required, for example as an OHP film. On the other hand while the method of coating an antistatic agent on a surface of a polyester film is excellent in transparency of the film, the antistatic agent is viscous to some extent due to its low molecular weight, and therefore films tend to be blocking with each other. Also, when only an antistatic agent is coated on a surface of a polyester film, the antistatic agent tends to peel off the surface of the film due to poor adhesion between the antistatic agent and the base film, results in disadvantage that the antistatic effect decreases. Also, the coated film has a defect that tapes or the like do not adhere thereon.

SUMMARY OF THE INVENTION

First object of this invention is to provide a polyester film having a high, stable antistatic property.

Second object of this invention is to provide a polyester film which is excellent not only in antistatic effect but also in each of transparency, flatness, slipperiness and anti-blocking property.

Another object of this invention is to provide an antistatic polyester film which is easy to handle during production, processing, commercialization, and employment thereof, and has the aforementioned performances constantly.

Still another object of this invention is to provide an industrially advantageous method of producing an antistatic polyester film having the aforementioned performances.

Other objects of this invention will be understood easily and more clearly from the following description.

As a result of extensive investigations by the present inventors, it has now been found that the above-described objects of this invention can be achieved by the provision of an antistatic polyester film comprising a polyester film having provided on one or both surfaces thereof a thin layer of a mixed composition, wherein (1) said mixed composition is composed essentially of
 (A) a polyester polyacrylic copolymer (hereafter, referred to as "component A");
 (B) an anion-type high molecular weight antistatic agent (hereafter, referred to as "component B");
 (C) a fine particle having an average particle diameter of no greater than about 0.5 μm (hereafter, referred to as "component C"); and
 (D) a wetting agent (hereafter, referred to as "component D"); and wherein (2) said components A, B, C, and D are present in amounts of about 20 to about 80 parts by weight, about 15 to about 70 parts by weight, about 5 to about 40 parts by weight, and 0 to about 30 parts by weight, respectively, per 100 parts by weight in total of said components A, B and C.

The antistatic polyester film of the above-described type according to this invention has a structure such that a very thin layer made of a mixed composition composed essentially of the aforementioned components A, B, C, and D is bonded uniformly and firmly on one or both surfaces of a base polyester film, and thus the polyester film has advantages that it is highly transparent and it has a surface which is even, easily sliding, and scarcely blocking.

DETAILED DESCRIPTION OF THE INVENTION

Hereafter, this invention will be described in greater detail.

In this invention, the polyester which is used to form a polyester film includes linear saturated polyester prepared from aromatic dibasic acid or ester-forming derivatives thereof and diol or ester-forming derivative thereof. Specific examples of such polyester include polyethylene terephthalate, polyethylene isophthalate, polybutylene terephthalate, poly(1,4-cyclohexylene-dimethylene terephthalate), polyethylene 2,6-naphthalene dicarboxylate, etc.; blends of these copolymers, and blends of these copolymers with other resins. Among these polyesters, polyethylene terephthalate and polyethylene 2,6-naphthalene-dicarboxylate are preferred, and polyethylene terephthalate is particularly suitable for the purpose of this invention.

The polyester film of this invention is one which is obtained by melt-extruding such linear saturated polyester as above in a conventional manner to form a film, and crystallizing the film by orientation and then by heat treatment. As the polyester film, preferred is one whose crystals are oriented to such an extent that the film has a heat of fusion of crystals measured in a stream of nitrogen using a scanning type calorimeter at a temperature elevation rate of 10° C./minute amounting to usually no less than 4 cal/g.

As the polyester film of this invention, there is used advantageously one which has a thickness of about 6 to about 250 μm, preferably about 10 to about 250 μm.

In this invention, the thin layer formed on one or both surfaces of the polyester film is essentially composed of
(A) a polyester polyacrylic copolymer (component A);
(B) an anion-type high molecular weight antistatic agent (component B);

(C) a fine particle having an average particle diameter of no greater than about 0.5 μm (component C); and (D) a wetting agent (component D), as an optional component, in the aforementioned proportions.

The polyester polyacrylic copolymer as component A has an excellent compatibility with the anion-type high molecular weight antistatic agent as component B, and combination of these components gives rise to a polyester film having transparency, antistatic property, and anti-blocking property superior to those of a polyester film obtained using an acrylic resin, or a polyester resin, or mixtures thereof instead of the aforementioned component A. Detailed explanation on the components A to D will follow.

COMPONENT A

The polyester polyacrylic copolymer (component A), which is water-soluble or water-dispersible, is known per se as a binder for polyester films (cf., for example, U.S. Pat. No. 4,880,700, Japanese Patent Application Laid-Open Nos. 34139/1988, 37937/1988 and 37938/1988).

The component A can be classified into the following groups (i), (ii) and (iii) which are used alone or as mixtures in this invention.

(i) polyester polyacrylic graft copolymer whose backbone polymer is a polyester and whose branch polymer is an acrylic polymer (component A-1);

(ii) polyester polyacrylic graft copolymer whose backbone polymer is an acrylic polymer and whose branch polymer is a polyester (component A-2); and (iii) polyester polyacrylic block copolymer (A-3 component).

Among the components A-1, A-2 and A-3, the component A-1 is most preferred as the component A.

The backbone polymer of the polyester polyacrylic graft copolymer as the component A-1 is a substantially linear polymer which can be prepared from polybasic acid or its ester-forming derivative and polyol or its ester-forming derivative. As the polybasic acid component of the polymer, there can be cited, for example, terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimeric acid, etc. These components may be used alone or two or more of them may be used in combination. Further, these components may be used with small proportions of unsaturated polybasic acids such as maleic acid, fumaric acid, and itaconic acid, and hydroxycarboxylic acids such as p-hydroxybenzoic acid and p-(β-hydroxyethoxy)benzoic acid. Proportions of the unsaturated polybasic acid component and of hydroxycarboxylic acid component are at most 10 mole %, preferably no more than 5 mole % for the saturated polybasic acid.

As the polyol component, there can be cited, for example, ethylene glycol, 1,4-butanediol, neopentyl glycol, diethylene glycol, dipropylene glycol, 1,6-hexanediol, 1,4-cyclohexanedimethanol, xylylene glycol, dimethylolpropionic acid, glycerin, trimethylolpropane, poly(ethylene oxide) glycol, poly(tetramethylene oxide) glycol, etc. These may be used alone or two or more of them may be used in combination.

The backbone polymer is preferably a water-soluble or water-dispersible polyester. Therefore, when preparing an aqueous dispersion, it is advantageous and preferred to use a copolymer containing, as a comonomer in the molecule, a compound having a hydrophilic group such as an organic sulfonic acid salt, a carboxylic acid salt, diethylene glycol, polyethylene glycol, or polytetramethylene glycol. For the introduction of the carboxylic acid salt, usually tri-functional or higher carboxylic acids are used. Such polyfunctional carboxylic acids tend to cause branching of the resulting polymer during the polymerization step, resulting in gelling, and therefore it is desirable to use the acids in decreased comonomer proportions. In this respect, introduction of hydrophilic groups using a sulfonic acid salt, diethylene glycol, or polyalkylene ether glycol is more advantageous than with a carboxylic acid salt because no problem arises that has been encountered when using the carboxylic acid salt.

In order to introduce a sulfonic acid salt in the molecule of polyester, it is preferred to use sulfonic acid alkali metal salt type compounds or sulfonamide type compounds such as 5-sodium sulfoisophthalate, 5-ammonium sulfoisophthalate, 4-sodium sulfoisophthalate, 4-methylammonium sulfoisophthalate, 2-sodium sulfoterephthalate, 5-potassium sulfoisophthalate, 4-potassium sulfoisophthalate, 2-potassium sulfoterephthalate, and sodium sulfosuccinate. It is preferred that the polybasic carboxylic acid or polyhydric alcohol having a sulfonic acid salt group contains 0.5 to 20 mole %, more preferably 1 to 18 mole % of the entire polybasic carboxylic acid component or polyhydric alcohol component.

In order to introduce a carboxylic acid salt group in the molecule of polyester, there can be used tri or tetrabasic polycarboxylic acid compounds or oxycarboxylic acid compounds such as trimellitic anhydride, trimellitic acid, pyromellitic anhydride, pyromellitic acid, trimesic acid, cyclobutanetetracarboxylic acid, and dimethylolpropionic acid. The carboxylic acid salt can be obtained by neutralizing the carboxyl group or groups with an amino compound, ammonia, an alkali metal or the like.

When introducing the hydrophilic group-containing compound in the molecule of polyester, various known methods can be used. To further explain how to introduce the carboxylic acid salt group or organic sulfonic acid salt group, various methods such as those set forth below can be used:

(1) a method in which a polyester is prepared using, as one component of the starting materials, a compound having a carboxylic acid salt group or an organic sulfonic acid salt group in the molecule.

(2) a method in which a polyester is prepared using, as one component of the starting materials, a compound having three or more carboxyl groups, and then free carboxyl groups in the polyester are neutralized in a medium with ammonia, an amine, an alkali metal compound or the like. To be more specific with the method (2) above, a polymer having a carboxyl group in a side chain is prepared using, for example, trimellitic anhydride as one component of the starting materials for the polyester, and after completion of the reaction ammonia water is added to neutralize the reaction mixture to form an aqueous polyester. It is preferred to prepare the polyester by a fusion polymerization method.

The branch polymer of the polyester polyacrylic graft copolymer as the component A-1 is an acrylic type polymer. As the acrylic monomer used in the preparation of the acrylic type polymer, there can be cited, for example, (a) alkyl acrylates or alkyl methacrylates (examples of the alkyl group in these compounds are a methyl group, an ethyl group, an n-propyl group, an isopropyl group, an n-butyl group, an isobutyl group, a t-butyl group, a 2-ethylhexyl group, a cyclohexyl group, etc.);

(b) hydroxyl group-containing monomers such as 2-hydroxyethyl acrylate, 2-hydroxyethyl methacrylate, 2-hydroxypropyl acrylate, and 2-hydroxypropyl methacrylate;

(c) amido group-containing monomers such as acrylamide, methacrylamide, N-methylmethacrylamide, N-methylacrylamide, N-methylolacrylamide, N-methylolmethacrylamide, N,N-dimethylol-acrylamide, N-methoxymethylacrylamide, N-methoxymethyl-methacrylamide, and N-phenylacrylamide;

(d) amino group-containing monomers such as N,N-diethylaminoethyl acrylate, and N,N-diethylaminoethyl methacrylate;

(e) epoxy group-containing monomers such as glycidyl acrylate, and glycidyl methacrylate; and (f) monomers having a carboxyl group or its salt such as acrylic acid, methacrylic acid, and their salts (e.g., sodium salts, potassium salts, ammonium salts, tertiary amine salts, etc.).

The acrylic monomers used in the preparation of the above-described acrylic type polymer may be used alone or as mixtures of two or more of them. Preferred examples of the monomer include (a) methyl acrylate, ethyl acrylate, butyl acrylate, 2-ethylhexyl acrylate, methyl methacrylate, and ethyl methacrylate, (b) 2-hydroxyethyl methacrylate, (c) acrylamide, N-methylolacrylamide, N-methylolmethacrylamide, N-methoxymethylacrylamide, and N-methoxymethylmethacrylamide, (d) N,N diethylaminoethyl acrylate, and N,N-diethylaminoethyl methacrylate, (e) glycidyl methacrylate, and (f) acrylic acid, and methacrylic acid, and their salts (sodium salts, potassium salts, ammonium salts, and tertiary amine salts).

Further, the aforementioned acrylic monomers may be used with other-type monomers. The other-type monomers may be any monomer that is copolymerizable with the acrylic monomers, for example, (i) epoxy group-containing monomers such as allyl glycidyl ether;

(ii) monomers having a sulfonic acid group or its salt, such as styrenesulfonic acid, vinylsulfonic acid, and their salts (sodium salts, potassium salts, ammonium salts, etc.);

(iii) monomers having a carboxyl group or its salt, such as crotonic acid, itaconic acid, maleic acid, and fumaric acid, and their salts (sodium salts, potassium salts, ammonium salts, etc.);

(iv) monomers having an acid anhydride group, such as maleic anhydride, and itaconic anhydride; and (v) other monomeric compounds such as vinyl isocyanate, allyl isocyanate, styrene, vinyl methyl ether, vinyl ethyl ether, vinyltrisalkoxysilane, monoalkyl maleate, monoalkyl fumarate, acrylonitrile, methacrylonitrile, monoalkyl itaconate, vinylidene chloride, vinyl acetate, and vinyl chloride.

The aforementioned other-type monomers may be used alone or two or more of them may be used to prepare copolymers. In view of imparting hydrophilic nature to the acrylic type polymer, dispersion stability of the aqueous liquid, adhesion of the polyester film, etc., the other-type monomer is preferably a polymer having a functional group such as a hydroxyl group, an amido group, or a carboxyl group, or its salt (sodium salt, potassium salt, ammonium salt or the like). When the other-type monomer is copolymerized, it is desirable to use it in an amount of no more than about 30 mole %, preferably no more than about 10 mole %.

The acrylic-type polymer may be grafted on the polyester (backbone polymer) by a graft polymerization method known per se, which can be roughly classified into three groups as below:

(A) a method in which an acrylic type monomer is graft-polymerized with generating reaction initiating points such as radicals, cations, or anions in the backbone polymer;

(B) a method in which an acrylic type monomer is graft-polymerized in the presence of a backbone polymer utilizing chain transfer reaction to the backbone polymer; and (C) a method in which a backbone polymer having a functional group in its side chain and a branch polymer having a group which reacts with the functional group are reacted.

Specific examples of the method A include a radical polymerization method in which an acrylic type monomer is graft-polymerization after generation of radicals in a backbone polymer by means of light, heat or radiation; a cationic polymerization method or anionic polymerization method in which an acrylic type monomer is graft-polymerized after generation of a cationic group or an anionic group in a backbone polymer by means of using a catalyst such as $AlCl_3$ or $TiCl_4$, or by means of using metallic Na, metallic Li, or the like, respectively; and the like. Specific examples of the method B include a method in which a polyester having a carboxyl group or a hydroxyl group in its side chain is reacted with glycidyl methacrylate, 2-hydroxyethyl acrylate, acrylic acid, or the like to introduce an unsaturated group in the side chain of the polyester, and then an acrylic type monomer is polymerized in the presence of the polyester; a method in which a polyester having a backbone chain to which an unsaturated group has been introduced using, as a component of the starting material, an unsaturated compound such as fumaric acid is reacted with an acrylic type monomer; and the like. Further, specific examples of the method C include a method in which a polyester having, for example, on its side chain, a hydrogen-donating group such as —OH, —SH, —NH$_2$, —COOH, or —CONH$_2$ (backbone polymer) is reacted with an acrylic type polymer having on one terminal thereof a hydrogen-accepting group such as

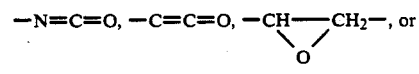, or

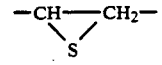

(branch polymer); a method in which a polyester having a hydrogen-accepting group on its side chain (backbone polymer) is reacted with an acrylic type polymer having a hydrogen-donating group on one terminal thereof (branch polymer) one terminal thereof; and the like. Other combinations of functional groups than is described above are, for example, —COOH and —COCl; —COOH and —OH; —COOH and —NH$_2$; —NH$_2$ and —OH; etc.

Proportion of the backbone polymer (polyester) to the branch polymer in the graft copolymer is preferably 5 : 95 to 95 : 5 by weight, more preferably 10 : 90 to 90 : 10 by weight. The backbone polymer has a weight average molecular weight of preferably about 5,000 to about 200,000, more preferably about 10,000 to about 100,000. The branch polymer has a weight average molecular weight of, preferably about 500 to about 50,000, more preferably about 1,000 to about 10,000.

Next, in the case of the polyester polyacrylic graft copolymer used as the component A-2, in which the backbone polymer is an acrylic type polymer and the branch polymer is a polyester, the polyester component and the acrylic type polymer component may be the same as those used in the polyester polyacrylic graft copolymer as the component A-1. Such copolymer can be prepared by grafting the polyester as branch polymer on the acrylic type polymer as a backbone polymer by any conventional method. The method for the preparation of the copolymer is not limited particularly and examples thereof include a method in which an unsaturated group is introduced at one terminal of the polyester, and the resulting polyester is copolymerized with the acrylic type monomer; a method in which a functional group such as a carboxyl group, a hydroxyl group, a methylol group or the like is introduced in a side chain of the acrylic type polymer, and the polymer is then reacted with the polyester in which a group reacting with the functional group, such as an epoxy group, an isocyanate group, a hydroxyl group, a methylol group or the like, has been introduced; and the like.

In the graft copolymer the backbone polymer (acrylic type polymer) has a weight average molecular weight of preferably about 5,000 to about 200,000, more preferably about 10,000 to about 100,000 while the branch polymer (polyester) has a weight average molecular weight of preferably about 500 to about 50,000, more preferably about 1,000 to about 10,000. Proportion by weight of the backbone polymer to the branch polymer in the graft copolymer is preferably 5 : 95 to 95 : 5, more preferably 10 : 90 to 90 : 10.

Further, each component of the polyester polyacrylic block copolymer as the component A-3 may be selected from those described above with respect to the components A-1 and A-2.

Such block copolymer (component A-3) can be prepared by various known methods, for example, a method in which an acrylic type unsaturated group is introduced at both terminals of the polyester and the resulting polyester is block-copolymerized with the acrylic type polymer; a method in which a group susceptible to a polymer reaction (for example, an isocyanate group, an epoxy group, a hydroxyl group, a carboxyl group or the like) is introduced at a terminal of the acrylic type polymer, and this group is reacted with a hydroxyl group, or a carboxyl group at a terminal of the polyester; a method in which after a polyol and a polycarboxylate has been subjected to interesterification reaction, polycondensation reaction is started at a temperature of 250° to 300° C. atmospheric pressure and proceeded finally under vacuum to obtain a polyester having a predetermined degree of polymerization, the polyester thus obtained and a polyacrylic polymer are dissolved in an organic solvent, followed by polymer reaction or the like to form a block copolymer-containing liquid.

In the block copolymer, the acrylic type polymer has a weight average molecular weight of preferably about 1,000 to about 50,000, more preferably about 2,000 to about 10,000, while the polyester has a weight molecular weight of preferably about 2,000 to about 50,000, more preferably about 3,000 to about 10,000. The component A-3 in its entirety has a weight average molecular weight is preferably about 5,000 to about 200,000. Proportion by weight of the acrylic type polymer to the polyester in the block copolymer is preferably 95 : 5 to 5 : 95, more preferably 80 : 20 to 20 : 80.

COMPONENT B

The anion-type high molecular weight antistatic agent (component B) is preferably water-soluble or water-dispersible. Advantageously, it has a molecular weight of about 5,000 to about 500,000, preferably about 10,000 to about 300,000. In order to improve the antistatic effect, a small amount of a low molecular weight type antistatic agent having a molecular weight lower than the component B may be used with the component B.

The high molecular weight antistatic agent as the component B is preferably a compound which can be obtained by (co)polymerizing a monomer component composed essentially of (i) about 30 to 100% by weight of a compound represented by formula (I)

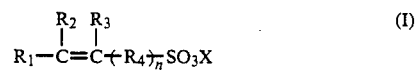

wherein $R_1$, $R_2$, and $R_3$ independently represent a hydrogen atom or a lower alkyl group; $R_4$ represents an alkylene chain having 1 to 6 carbon atoms which may be substituted with a lower alkyl group (the alkylene chain may contain 1 to 3 hetero atoms selected from N, O and S); X represents an alkali metal, or —NH($R_5$)$_3$ (where $R_5$ represents a hydrogen atom or a lower alkyl group); and n is 0 or 1; and (ii) 0 to 70% by weight of a compound which is other than the compound (i) above and is copolymerizable therewith.

In the general formula (I) above, the lower alkyl group represented by $R_1$, $R_2$, $R_3$, or $R_5$ is alkyl groups having 1 to 4 carbon atoms, for example, a methyl group, an ethyl group, and a propyl group. $R_4$ is an alkylene chain having 1 to 6 carbon atoms which may be substituted with a lower alkyl group, and the alkylene group may contain 1 to 3 hetero atoms selected from N, O and S. Examples of the alkali metal represented by X include lithium, sodium and potassium. Examples of the —NH($R_5$)$_3$ represented by X include —NH$_4$ and —NH(CH$_3$)$_3$.

Specific examples of the compound represented by the general formula (I) above include sodium allylsulfonate, sodium methallylsulfonate, sodium crotylsulfonate, lithium allylsulfonate, lithium methallylsulfonate, lithium crotylsulfonate, potassium allylsulfonate, potassium methallylsulfonate, ammonium allylsulfonate, ammonium methallylsulfonate,

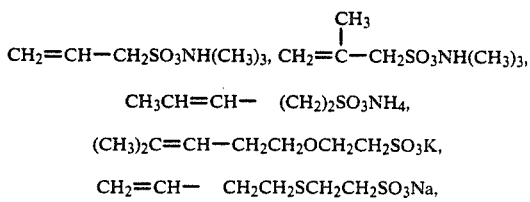

-continued

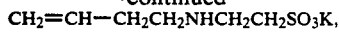

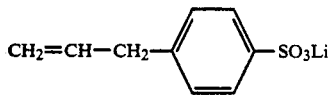

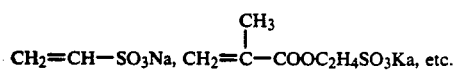

These compounds are used in amounts of about 30 to 100% by weight, preferably about 50 to about 80% by weight, based on sum of one of these compounds and the other compound being defined as 100% by weight.

Examples of the other compound copolymerizable with the compound represented by the general formula (I) above include the same monomers as those used for the branch polymer (acrylic type polymer) of the polyester polyacrylic graft copolymer as the component A-1.

The other compound may be used in an amount of 0 to about 70% by weight, preferably about 20 to about 50% by weight, based on sum of the other compound and the compound represented by the general formula (I) above being defined as 100% by weight.

The anion-type high molecular weight antistatic agent (component B) used in this invention is a polymer having a molecular weight no lower than 5,000. The molecular weight of the polymer below 5,000 is undesirable because the antistatic property and adhesion of the film which are aimed at by this invention can be obtained only insufficiently.

COMPONENT C

The fine particle (component C) used in this invention has an average particle diameter of no greater than about 0.5 μm. As the fine particle, those having an average particle diameter of about 0.01 to about 0.15 μm are preferred. If the average particle diameter is larger than 0.5 μm, the resulting polyester film has a decreased transparency and a decreased resistance to scratching (durability) and is not preferred. The fine particle may be either a fine particle of an organic polymer or an inorganic fine particle. Specific examples of the fine particle (component C) include organic fine particles such as polystyrene, polymethyl methacrylate, methyl methacrylate copolymers, cross-linked methyl methacryalte copolymers, polytetrafluoroethylene, polyvinylidene fluoride, polyacrylonitrile, and benzoguanamine resin; inorganic fine particles such as silica, alumina, titanium dioxide, kaolin, talc, graphite, calcium carbonate, feldspar, molybdenum disulfide, carbon black, and barium sulfate; and the like. They may be in the form of aqueous dispersions using an emulifier or in the form of fine powders which can be added to aqueous liquids. Among them, preferred are fine powders of the organic polymer, particularly fine powders of polymethyl methacrylate. In order to prevent settlement in water dispersions, it is preferred that the fine particle has a specific gravity not exceeding 3.

The above-described fine particle exhibits an activity of accelerating uniform formation of minute protrusions in the thin layer itself and an activity of reinforcing the thin layer due to presence of the fine particle itself, and in addition, an activity of increasing anti-blocking property of and decreasing friction of the film as well as an activity of increasing scratch resistance of the thin layer by synergism with the component A and coupled therewith an activity of imparting excellent slip characteristics of the polyester film.

COMPONENT D

Desirably, the wetting agent (component D) in this invention is used in order to smoothly form a thin layer on a surface of the polyester film. It is preferred that the wetting agent is a surfactant which is chemically inert to each of the components A, B, and C. Particularly, anion type or nonion type surfactant is preferred. The component D is advantageously whose aqueous solution can have a surface tension on a surface of the polyester film of no higher than 50 dyne/cm, preferably no higher than 40 dyne/cm. As such wetting agent (component D), there can be cited, for example, anionic or nonionic surfactants such as polyoxyethylenealkyl phenyl ethers, polyoxyethylene fatty acid esters, sorbitan fatty acid esters, glycerin fatty acid esters, fatty acid metal soaps, alkyl sulfates, alkyl sulfonates, and alkyl sulfosuccinates.

CONSTRUCTION OF THIN LAYER

In the antistatic polyester film of this invention, the thin layer formed on one or both surfaces of the polyester film is made of a mixed composition composed essentially of the components A, B, C and D as described above. The mixed composition contains the components A, B, C, and D in amounts of about 20 to about 80 parts by weight, preferably about 30 to about 70 parts by weight; about 15 to about 70 parts by weight, preferably about 20 to about 60 parts by weight; about 5 to about 40 parts by weight, preferably about 10 to about 30 parts by weight; and 0 to about 30 parts by weight, preferably 0 to about 20 parts by weight; respectively, per 100 parts by weight in total of said components A, B and C.

In the mixed composition which constitutes the thin layer, the quantity of the component C is no greater than double the quantity by weight of the component A (proportion of the component C to the component A being no greater than 2 : 1 by weight), preferably no greater an the quantity by weight of the component A (proportion of the component C to the component A being no greater than 1 : 1). If the proportion is greater than 2 : 1, the thin layer provided for the prevention of charge has a decreased resistance to chipping, and chips formed adhere to guide rolls in a film transportation system, resulting in transfer of chips onto a surface of the film to give rise to undesirable unevenness on the surface of the film.

The mixed composition may contain small amounts of various other components such as ultraviolet adsorbents, and lubricants in addition to the components A, B, C, and D within the ranges where the objects of this invention can be achieved.

In this invention, the mixed composition which forms a thin layer on one or both surfaces of the polyester film is preferably one in which the above-described components are each homogeneously mixed, and it is desirable that the thin layer is formed uniformly on the surface(s) of the polyester film.

It is desirable that the thin layer (i.e., mixed composition) is present on one surface of the polyester film in a proportion of about 0.001 to about 1 g/m², preferably about 0.01 to about 0.3 g/m², on dry basis in order to achieve the objects of this invention.

METHOD FOR PRODUCTION OF ANTISTATIC POLYESTER FILM

Thus, according to this invention, there is provided a method for producing the aforementioned antistatic polyester film comprising coating a polyester film on one or both surfaces thereof with a water dispersion of a mixed composition, wherein (1) said mixed composition is composed essentially of
   (A) a polyester polyacrylic copolymer (component A);
   (B) an anion-type high molecular weight antistatic agent (component B);
   (C) a fine particle having an average particle diameter of no greater than about 0.5 μm (component C); and
   (D) a wetting agent (component D); and (2) said components A, B, C, and D are present in amount of about 20 to about 80 parts by weight, about 15 to about 70 parts by weight, about 5 to about 40 parts by weight, and 0 to about 30 parts by weight, respectively, per 100 parts by weight in total of said components A, B and C.

The coating in this invention is advantageously performed during the step of producing the polyester film. For example, it is preferred that a water dispersion of the mixed composition containing the components A, B, C, and D be coated on one or both surfaces of the polyester film before the process of orientation of crystals of the polyester film can be completed.

Here, the polyester film before completion of orientation of crystals includes unstretched films obtained by heat melting the polymer and molded as-is in the form of a film; monoaxially stretched films obtained by orientating the unstretched in one direction, either longitudinally or transversely; biaxially stretched films obtained by stretching longitudinally and transversely at low stretch rates to orient it (biaxially stretched films before final longitudinal or transverse re-stretching for completing the orientation of crystals); and the like.

The antistatic polyester film of this invention is produced by a so-called in-line coating method in which a water dispersion of the above-described composition is applied to a polyester film in a state where it has been unstretched or stretched in at least one direction but preferably before completion of orientation of crystals, and the thus treated polyester film is subjected as-is to longitudinal stretching and/or transverse stretching and heat setting. On this occasion, corona discharge treatment may be practiced on the surface(s) of the film as pretreatment so that a thin layer can be formed smoothly on the surface(s) of the polyester film before completion of the process of orientation of crystals.

The corona discharge treatment is recommended in the case where the water-dispersion used in the coating treatment contains no component D.

Total concentration of the components A, B, C, and D in the water dispersion used in the coating treatment is usually no higher than 30% by weight, preferably no higher than 15% by weight. The viscosity of the water-dispersion is suitably no higher than 100 cps, preferably no higher than 20 cps. The amount of coating of the water-dispersion is preferably about 0.5 to about 20 g, more preferably about 1 to about 10 g, per m² of the polyester film to be treated.

For the coating, various known coating methods can be used. For example, a roll coating method, a gravure coating method, a roll brush method, a spray coating method, an air-knife coating method, a dipping method and a curtain coating method may be applied singly or in combination.

In the method of producing the antistatic polyester film according to one preferred embodiment of this invention, the water-dispersion is coated on the polyester film immediately after having been subjected to, preferably longitudinal monoaxial stretching, and then the film thus treated is guided to a tenter for transverse stretching and heat setting. On this occasion, the coated material is in a state of an unsolidified coating film and its area is enlarged along as the film is stretched and evaporated hot water, resulting in that a thin layer having a number of minute protrusions is firmly bond on the surface(s) of the biaxially stretched polyester film. The heat treatment is performed preferably at a temperature of about 100 to about 240° C. for about 1 to about 20 seconds.

The conditions of orientation of crystals of the polyester film, e.g., conditions of stretching, heat setting and the like may be those conventionally employed in the art.

The thin layer formed on the polyester film is excellent in transparency, and shows a haze of, for example, no higher than 0.5% when the thickness of the thin layer (on one surface) is 0.04 g/m². The haze of the entire antistatic polyester film is preferably no higher than 1.7% when the thickness is 100 μm.

The antistatic polyester film of this invention is excellent in adhesion, transparency, slidability, antistatic property, and anti-blocking property simultaneously, by coating the base film with the mixture of the polyester polyacrylic copolymer (component A) as a binder, the fine particle having a specified particle diameter, particularly an organic fine particle, (component C), the anion-type high molecular weight antistatic agent (component B), and the wetting agent (component D). The antistatic polyester film of the invention is useful particularly as films for OHP, films for use in solar systems, and charge films for photo mechanical processes. The polyester film of this invention has a surface resistivity of, for example, $10^8$ to $10^{13}$ $\Omega/\square$ under suitable conditions $10^9$ to $10^{12}$ $\Omega/\square$, and the surface resistivity is hardly susceptible to influences of the atmosphere in which it is placed. Further, the film of the invention is excellent in adhesion of the coating film to the base film.

EXAMPLES

Hereafter, this invention will be described in more detail by way of examples. In the following examples and comparative example, "parts" are all by weight. The characteristics of the polyester films used were measured by the following methods.

1. Surface Resistivity

On a 8 cm-square film sample was applied aluminum by vapor deposition, and the sample was measured on its surface resistivity ($\Omega/\square$) under conditions of 23° C. and 60% RH using a high voltage power source resistor and microampero-potentiometer of an oscillating capacity type.

2. Surface Slip Characteristics

Static friction coefficient under a load of 1 kg between two pieces of a film sample was measured at 23° C. and 60% RH using a slippery tester manufactured by Toyo Tester Co., Ltd., with the coated surface of one piece contacting the coated surface of another.

3. Blocking Property

Front surface of one piece of a film sample was attached to back surface of another piece of the film sample and cut to a rectangle of a size of 10 cm × 15 cm. To this was applied a load of 50 kg/cm² in an atmosphere of 50° C. and 50% RH for 17 hours, and peel strength of the sample of 10 cm wide was measured. The peel rate then was 100 mm/minute.

4. Surface Roughness (Ra)

This was measured according to JIS-B-0601. That is, a surface roughness curve of a film sample was depicted on a chart using a stylus type surface roughness meter (SURFCOM 3B, manufactured by Tokyo Seimitus Co., Ltd.) under conditions of a radius of the needle being 2 μm, and a load of 0.07 g, and a part of the film sample was picked up in a length of L from the surface roughness curve thus obtained in the direction toward a center line, and when the center line of the extracted part was defined as an X axis and an axis in a longitudinal direction as a Y axis and the surface roughness curve was expressed by a formula Y=f(x), the value given by the following formula (Ra: μm) was defined the surface roughness of the film.

$$Ra = (1/L) \int_O^L |f(x)| dx$$

In this invention, eight samples were measured with setting the standard length to 0.25 mm, and three values which were the largest three were removed from among eight values obtained, and Ra is expressed an average value calculated from the rest five values.

5. Haze of Film

This was measured using Poic Hazemeter SEP-HS-D1 manufactured by Nippon Seimitsu Kogaku Co., Ltd.

COMPARATIVE EXAMPLE 1

Polyethylene terephthalate containing no filler and having an intrinsic viscosity of 0.65 measured in o-chlorophenol at 25° C. was melt-extruded from an extruder through a mouthpiece, and molded into an unstretched film having a thickness of 1,050 μm on a rotary cooling drum cooled to 40° C. with applying static charge thereto. The resulting film was stretched in a longitudinal direction at a stretch rate of 3.6 times the original on a metal roll heated to 93° C. Then, the stretched film was introduced in a tenter and passed through a preheating zone therein at 98° C., and stretched 3.9 times the original in a transverse direction. Further, the thus-treated film was heat-set at 225° C. for 6.3 seconds to complete orientation of crystals, and thereafter wound up in a width of 500 mm under a winding tension of 9.8 kg, with slitting the edges. Finally, the film obtained has a thickness of 75 μm.

Creases occurred in the resulting film roll due to poor slipping between the films. Once creases had occurred, they propagated one after another toward the surface portion of the roll and focused thereon, resulting in poor wound up appearance of the film unsuitable for commercial goods with one end of the roll becoming harder and the central portion softer. Separately, the film was wound up under a lower winding tension as low as 4.66 kg, but the wound up appearance of the film was incomplete because not only the ends thereof were uneven but also crease upon winding occurred. Various characteristics of the film are shown in Table 1.

EXAMPLE 1

A graft polymer (8 parts) which was prepared by a polymer reaction between 3 parts of a polyester composed of an acid component composed of terephthalic acid (50 mole %), isophthalic acid (45 mole %), and trimellitic acid (5 mole %) and a glycol component composed of ethylene glycol (80 mole %) and diethylene glycol (20 mole %), and having an intrinsic viscosity measured in o-chlorophenol at 25° C. of 0.28, and 6 parts of an acrylic type copolymer composed of methyl methacrylate (48 mole ethyl acrylate (47 mole %), and 2-hydroxylethyl acrylate (5 mole %) was dissolved in 90 parts of tetrahydrofuran, and 2 parts of NONION NS 208.5, a nonion type surfactant [HLB 12.8] was added to the resulting solution.

Water (490 parts) was gradually added to the solution while stirring it, and then the mixture was heated for distillation to remove tetrahydrofuran as the solvent to obtain an aqueous liquid of acryl-modified polyester composition.

Then a dispersion was prepared which had a solid content of 2% by weight and whose solid contents ratios of the antistatic thin layer after evaporation to dryness were adjusted to be as set forth below:

| | | |
|---|---|---|
| (A) | The above-described acryl-modified polyester composition | 50 parts |
| (B) | Antistatic agent composed of methyl methacrylate/acrylonitrile/Na methacrylsulfonate = 49/8/43 (by mole %) and having a molecular weight of about 500,000 | 30 parts |
| (C) | Cross-linked polymethyl methacryalte-type filler having an average particle diameter of 0.04 μm | 10 parts |

In the same method for the production of a biaxially film as used in Comparative Example 1, the above-described dispersion was uniformly coated by a kiss coating method on one surface of a monoaxially stretched film after completion of longitudinal stretching at a position immediately before entering a tenter. The average coating amount on this occasion was about 4 g on wet basis per m² of the above-described monoaxially stretched film (this amount corresponds to about 0.02 g per m² of the biaxially stretched film described hereinbelow). The monoaxially stretched film coated on one surface thereof was introduced in a tenter, and passed through a preheating zone therein at 98° C., and stretched 3.9 times the original in a transverse direction. Further, the thus-treated film was heat-set at 225° C. The characteristics of the film are shown in Table 1.

EXAMPLE 2

To a water dispersion of a copolymer polyester, "Pesresin 2,000", manufactured by Takamatsu Yushi Co., Ltd. were added an emulsifier, a polymerization initiator, and acrylic monomers; methyl methacrylate, acrylic acid and glycidyl methacrylate, and the mixture was radical polymerized to obtain a liquid containing an acryl-modified polyester. Using the acryl-modified polyester, a coating liquid was obtained which had a solid content of 4% by weight and the solid contents ratios thereof after evaporation to dryness were adjusted to be as set forth below:

| (A) Acryl-modified polyester of Pesresin 2,000 type | 40 parts |
| --- | --- |
| (B) Antistatic agent as used in Example 1 | 30 parts |
| (C) Filler as used in Example 1 | 15 parts |
| (D) NONION NS 208.5 | 5 parts |

Using the dispersion, an antistatic polyester film was prepared in the same manner as in Example 1. The characteristics of the film are shown in Table 1. The thickness of the film corresponds to about 0.04 g/m$^2$ in biaxially stretched films.

EXAMPLE 3

Using an antistatic agent composed of methyl methacrylate/ethyl acrylate/2-Na sulfoethyl methacrylate =51/24/25 (by mole %) and having a molecular weight of about 500,000, a dispersion similar to that obtained in Example 2 was prepared. The dispersion was coated uniformly on one surface of a monoaxially stretched film, and then a biaxially stretched film was produced in the same manner as in Comparative Example 1. The characteristics of the film are shown in Table 1.

EXAMPLE 4

In the same method for the production of a biaxially film as used in Comparative Example 1, a monoaxially stretched film after completion of longitudinal stretching at a position was subjected to corona discharge treatment at 50 W/minute.m from below before the film entered the tenter, and then a dispersion having a solid content of 4% by weight and adjusted by evaporation to dryness such that the solid contents ratios were as set forth below was uniformly coated by a kiss coating method on one surface of the film, followed by producing an antistatic polyester film in the same manner as in Example 1.

| (A) Acryl-modified polyester as used in Example 3 | 50 parts |
| --- | --- |
| (B) Antistatic agent as used in Example 1 | 30 parts |
| (C) Cross-linked polymethyl methacrylate-type filler having an average particle diameter of 0.08 μm | 20 parts |

The thickness of the thin layer in the polyester film obtained in Example 4 corresponds to about 0.06 g/m$^2$ of a biaxially stretched film after drying. The characteristics of the film are shown in Table 1.

Comparative Examples 2 and 3

An antistatic polyester film was obtained in the same manner as in Example 2 except that a water dispersion of copolymer polyester, "Pesresin 4,000" manufactured by Takamatsu Yushi Co., Ltd., (comparative Example 2), or a self-crosslinking type acrylic emulsion "Primal HA-16", manufactured by Rohm & Haas (Comparative Example 3) was used instead of the acryl-modified polyester s used in Example 2. The characteristics of the films thus obtained are shown in Table 1.

COMPARATIVE EXAMPLE 4

An antistatic polyester film was obtained in the same manner as in Example 2 except that the antistatic agent used in Example 2 was replaced by sodium alkyl diphenyl ether difulfonate having a low molecular weight. The characteristics of the film obtained are shown in Table 1.

TABLE 1

| Run | Surface Resistivity (Ω/□) | Surface Slip Characteristics | Anti-blocking property (g/10 cm) | Surface Roughness (μm) | Haze (%) |
| --- | --- | --- | --- | --- | --- |
| Example 1 | 7 × 10$^{11}$ | 0.45 | 2 | 0.007 | 0.8 |
| Example 2 | 1.6 × 10$^{10}$ | 0.48 | 3 | 0.006 | 0.7 |
| Example 3 | 3 × 10$^{10}$ | 0.50 | 4 | 0.007 | 0.7 |
| Example 4 | 1 × 10$^{10}$ | 0.42 | 5 | 0.009 | 0.8 |
| Comparative Example 1 | 2 × 10$^{17}$ | unable to be measured | 0 | 0.004 | 0.5 |
| Comparative Example 2 | 9 × 10$^9$ | 0.50 | 15 | 0.006 | 1.3 |
| Comparative Example 3 | 4 × 10$^{10}$ | 0.38 | 12 | 0.010 | 1.3 |

As will be clear from Table 1, the polyester film of this invention is transparent and has a good antistatic property as well as excellent anti-blocking property and excellent slip characteristics.

EXAMPLE 5

Each of the films obtained in Example 1 and comparative Example 1 was wound up in the form of a roll, and after having been stored at 40° C. for 2 days, a surface opposite to the surface on which antistatic treatment was performed was measured on its surface resistivity by the conventional method and adhesivity of UV ink by the following method. That is, after having printed an ultraviolet ray-curing type printing ink (Flash Dry FDO Red APN, manufactured by Toyo Ink Manufacturing Co., Ltd.) on a polyester film using an RI tester (manufactured by Mei Seisakusho), the ink was cured using a UV cure device with a medium pressure mercury lamp (80 W/cm, a single lamp type; manufactured by Nippon Denchi) to form a UV ink layer having a thickness of 7.0 μm. The UV ink layer was notched by cross cutting squarely with a cutter knife and an adhesive tape was fixed thereon, followed by performing 90° peeling in a normal direction. The UV ink bondability of samples was evaluated by five grade rating of their state of peeling, with a sample showing a good peeling state being rated grade 5 and that showing a poor peeling state being rated grade 1.

The characteristics of the films measured are shown in Table 2 below.

TABLE 2

| Kind of Film | Surface Resistivity (Ω/□) | | Adhesivity of UV Ink | |
| --- | --- | --- | --- | --- |
| | Antistatic Surface | Opposite Surface | Antistatic Surface | Opposite Surface |
| Example 1 | 8 × 10$^{11}$ | 9 × 10$^{15}$ | 4 | 2 |
| Comparative Example 1 | 8 × 10$^{16}$ | 3 × 10$^{16}$ | 2 | 2 |
| Comparative Example 4 | 2 × 10$^{10}$ | 2 × 10$^{13}$ | 3 | 1 |

The results in Table 2 revealed that obviously, the low molecular weight antistatic agent used in Comparative Example 4 was transferred to the opposite surface to aggravate the adhesion of the UV ink while the film obtained in Example 1 suffered from no adverse influence on the adhesion of opposite surface no transfer of the antistatic agent occurred to the opposite surface.

What is claimed is:

1. An antistatic polyester film comprising a polyester film having provided on one or both surfaces thereof a layer of a mixed composition, wherein
    (1) said mixed composition is composed essentially of
        (A) a polyester polyacrylic copolymer;
        (B) an anionic antistatic agent having a weight average molecular weight of about 5000 to 500,000;
        (C) particles having an average particle diameter of no greater than about 0.5 μm and being formed by at least one organic polymer selected from the group consisting of polymethyl methacrylate, methyl methacrylate copolymers and crosslinked methyl methacrylate copolymers;
        (D) a wetting agent; and wherein
    (2) said components A, B, C, and D are present in amounts of about 20 to about 80 parts by weight, about 15 to about 70 parts by weights, about 5 to about 40 parts by weight, and 0 to about 30 parts by weight, respectively, per 100 parts by weight in total of said components A, B and C.

2. The polyester film as claimed in claim 1, wherein said components A, B, C, and D are present in amounts of about 30 to about 70 parts by weight, about 20 to about 60 parts by weight, about 10 to about 30 parts by weight, and 0 to about 20 parts by weight, perspectively, per 100 parts by weight in total of said components A, B and C.

3. The polyester film as claimed in claim 1, wherein said polyester film has a layer of said mixed composition, said layer having a thickness of about 0.01 to about 0.3 g per m² per surface.

4. The polyester film as claimed in claim 1, wherein said mixed composition is a homogeneous mixture composed of said components A, B, C, and D.

5. The polyester film as claimed in claim 1, wherein said component A is a water-soluble or water dispersible polyester polyacrylic copolymer.

6. The polyester film as claimed in claim 1, wherein said component A is at least one member selected from the group consisting of
    A-1 a polyester polyacrylic graft copolymer whose backbone polymer is a polyester and whose branch polymer is an acrylic polymer;
    A-2 a polyester polyacrylic graft copolymer whose backbone polymer is a polyacrylic polymer and whose branch polymer is a polyester; and
    A-3 a polyester polyacrylic block copolymer;
    each of said components A-1, A-2 and A-3 being water-soluble or water-dispersible.

7. The polyester film as claimed in claim 1, wherein said component A is said component A-1 being water-soluble or water-dispersible.

8. The polyester film as claimed in claim 1, wherein said component B is a water-soluble or water-dispersible anionic antistatic agent.

9. The polyester film as claimed in claim 1, wherein said component B is a water-soluble antistatic agent obtained by (co)polymerizing a monomer component consisting essentially of j
    (i) about 30 to 100% by weight of a compound represented by formula (I)

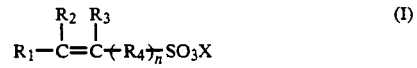

wherein $R_1$, $R_2$, and $R_3$ independently represent a hydrogen atom or a lower alkyl group; $R_4$ represents an alkylene chain having 1 to 6 carbon atoms which can be optionally substituted with a lower alkyl group and wherein said alkylene chain may be interrupted with 1 to 3 hetero atoms selected from the group consisting of N, O and S; X represents an alkali metal, or $-NH(R_5)_3$ where $R_5$ represents a hydrogen atom or a lower alkyl group; and n is 0 or 1; and (ii) 0 to 70% by weight of a compound which is other than the compound (i) above and is copolymerizable therewith.

10. The polyester film as claimed in claim 1, wherein said component C has an average particle diameter of about 0.01 to about 0.15 μm.

11. The polyester film as claimed in claim 1, wherein said component D is a surfactant an aqueous solution of which can have a surface tension of no higher than 50 dyne/cm on a surface of said polyester film.

12. The polyester film as claimed in claim 1, wherein said component D is an anionic or nonionic surfactant.

* * * * *